United States Patent [19]

Agarwal et al.

[11] 4,359,547

[45] Nov. 16, 1982

[54] PRESSURE SENSITIVE ADHESIVE COMPOSITIONS

[75] Inventors: Pawan K. Agarwal, Westfield, N.J.; Henry S. Makowski, deceased, late of Scotch Plains, N.J., by Patricia H. Makowski, executrix, Scotch Plains, N.J.

[73] Assignee: Exxon Research and Engineering Co., Florham Park, N.J.

[21] Appl. No.: 292,192

[22] Filed: Aug. 12, 1981

[51] Int. Cl.$^3$ .............................................. C08L 23/36
[52] U.S. Cl. .................................... 524/504; 524/500; 524/542; 525/344; 525/380
[58] Field of Search ............... 260/33.8 EP, 33.6 EP; 525/344, 380; 524/504, 500

[56] References Cited

U.S. PATENT DOCUMENTS

| | | | |
|---|---|---|---|
| 2,922,773 | 1/1960 | Coler et al. ............... | 260/32.6 PQ |
| 3,392,096 | 7/1968 | Lawton et al. ............... | 525/344 |
| 3,629,025 | 12/1971 | Walles ............... | 525/344 |
| 3,770,706 | 11/1973 | Walles ............... | 525/344 |
| 3,940,377 | 2/1976 | Horowitz et al. ............... | 525/344 |
| 4,243,772 | 1/1981 | Paul et al. ............... | 525/344 |

*Primary Examiner*—Joseph L. Schofer
*Assistant Examiner*—N. Sarefin
*Attorney, Agent, or Firm*—Richard E. Nanfeldt

[57] ABSTRACT

This invention relates to pressure sensitive adhesive compositions which include an amine terminated polyalkylene oxide neutralized sulfonated thermoplastic polymer, wherein the neutralized sulfonated thermoplastic polymer has about 5 to about 250 meq. of neutralized sulfonate groups per 100 grams of the neutralized sulfonated thermoplastic polymer, dissolved in a nonreactive solvent at a concentration level of about 5 grams to about 25 grams per 100 ml. of nonreactive solvent. To control the end use properties of the solvent-based pressure-sensitive formulations, optionally, tackifying resins can also be incorporated in the solution.

5 Claims, No Drawings

PRESSURE SENSITIVE ADHESIVE COMPOSITIONS

BACKGROUND OF THE INVENTION

1. Field of the Invention

This invention relates to pressure sensitive adhesive compositions which include an amine terminated polyalkylene oxide neutralized sulfonated thermoplastic polymer, wherein the neutralized sulfonated thermoplastic polymer has about 5 to about 250 milliequivalents (meq.) of neutralized sulfonate groups per 100 grams of the neutralized sulfonated thermoplastic polymer, dissolved in a nonreactive solvent at a concentration level of about 5 grams to about 25 grams per 100 ml. of non-reactive solvent. To control the end use properties of the solvent-based pressure-sensitive formulations, optionally, tackifying resins can also be incorporated in the solution.

Broadly speaking, synthetic adhesives used in packaging can be classified into four categories: water based, solvent based, reactive and hot melt adhesives. Of these four, currently the water based are used most extensively. Usually the water based adhesives are based on emulsion polymers and are applied to porous cellulosic substrates. Energy from the outside in some fashion is applied to the system to evaporate the water in order that a strong bond may be formed. Besides this energy requirement for the formation of the bond, there is another complication with the use of water-based adhesive. For a uniform coating, a good unform wetting of the substrate surface is desired, which is not easily achieved.

The key requirements for pressure-sensitive adhesives are that they should have good cohesive and tackifying properties at ambient conditions. These adhesives should also have good flow characteristics if they are to be used in the bulk state, otherwise they should possess sufficient consistency when dissolved in suitable solvents so that they can be coated or sprayed on the surfaces to be bonded.

2. Prior Art

Several U.S. Patents have described sulfonated polymers such as sulfonated Butyl rubbers and sulfonated EPDM in adhesive applications (e.g., U.S. Pat. Nos. 3,867,247 and 3,801,531). It is important to distinguish the instant invention over those prior art systems. The former patent is directed at a sulfonated butyl cement which is solvent-based and is employed to laminate various substrates. It is important to note that the instant invention differs dramatically from that patent as follows:

(a) The instant invention may optionally include a tackifier resin;

(b) The instant invention is directed to sulfonated thermoplastic polymers which are neutralized with amine terminated polyalkylene oxides; and (c) The instant invention is directed at sulfonated thermoplastic polymers whereas most of the prior art deals with sulfonated Butyl rubber (e.g., U.S. Pat. No. 3,867,247).

With regard to the latter point, historically polystyrene systems do not possess tack properties. This problem becomes even more acute when polystyrene is sulfonated to levels of 5 to 250 meq. per 100 grams of polymer and neutralized. The resulting compositions have been widely used as the basis for ionically crosslinked plastics. The use of these materials in such applications is, in part, a demonstration that the properties of such materials are just the opposite of those desired for adhesive. In fact, such materials are remarkably devoid of tack or adhesion. The art, therefore, of converting such physically crosslinked materials into suitable adhesive candidates is a particularly challenging one for two reasons: (a) the polystyrene backbone is particularly unsuited for that purpose being a very dry thermoplastic; and (b) the strong associations attributable to metal sulfonate crosslinks further inhibit adhesion to any particular substrate.

Despite these handicaps, there are some very good reasons for solving the problems associated with converting sulfonated polystyrene into a good pressure sensitive adhesive composition. The excellent thermal stability inherent in the polystyrene backbone is a very desirable property for adhesives, which will be exposed to high temperatures for long times. Most adhesives based on other elastomeric backbones can suffer degradation under those conditions.

SUMMARY OF THE INVENTION

This invention relates to a pressure sensitive adhesive composition which includes an amine terminated polyalkylene oxide neutralized sulfonated thermoplastic polymer which has about 5 to about 250 meq. of neutralized sulfonate groups per 100 grams of the neutralized sulfonated thermoplastic polymer dissolved in a nonreactive solvent at a concentration level of about 5 grams to about 25 grams per 100 ml. of the nonreactive solvent.

General Description

The present invention relates to unique and novel pressure sensitive adhesive compositions which comprise a solution of an amine terminated polyalkylene oxide neutralized sulfonated thermoplastic polymer dissolved in a nonreactive solvent at a concentration of about 5 grams to about 25 grams per 100 ml. of nonreactive solvent wherein, a hydrocarbon tackifying resin, oil, and/or a filler can optionally be added to the compositions, thereby modifying the solution and physical properties of the final pressure sensitive adhesive compositions.

Sulfonated Polymer and Process for Forming

The neutralized sulfonated thermoplastic polymers of this present instant invention are derived from thermoplastic polymers which have a softening point (glass transition temperature) of between about 25° C. to about 260° C., and more preferably about 25° C. to about 150° C., and most preferably about 35° C. to about 150° C. These thermoplastic polymers have a weight average molecular weight as measured by GPC of about 5,000 to 500,000, and more preferably about 20,000 to about 350,000. The term "thermoplastic" is used in its conventional sense to mean a substantially rigid (flexural modulus > 10,000 psi) material capable of retaining the ability to flow, at elevated temperatures, for relatively long times.

The thermoplastic polymers can be prepared by a direct addition polymerization process wherein the chief monomeric components are selected from the group consisting of:

Alpha olefins, such as styrene, vinyl toluene, t-butylstyrene, alpha-methyl styrene, chlorostyrene, vinyl cyclohexane, 1,6-hexadiene, and the like; acrylates and methacrylates, such as methyl methacrylate; vinyl acylates, such as vinyl acetate; vinyl halides, such as vinyl chloride; nitrile-containing monomers, such as acrylonitrile and methacrylonitrile; cyclic monomers, such as oxycyclobutane, tetrahydrofuran, trimethylene sulfide, lactones, e.g., caprolactone; aldehydes, such as formaldehyde, acetaldehyde; vinyl alkyl ethers; and amide-containing monomers, such as acrylamide.

The thermoplastic polymers can also be prepared by a condensation process, such as polyesters, polyanhydrides, polyamides and polycarbonates.

Preferably, the thermoplastic polymers are polyvinyl-aromatics, most preferably polystyrene, poly-t-butylstyrene, polyvinyl toluene, and polyalpha-methyl styrene.

The sulfonate groups can be readily introduced into the aforementioned monomers polymers by one of four means.

A. Copolymerization with Sulfonate-Containing Monomers

Alkali metal salts of styrene sulfonic acid can be copolymerized by using free radical initiations with a plurality of thermoplastic forming monomers such as styrene, acrylamide, methyl methacrylate, and t-butylstyrene.

B. Direct Sulfonation of Homopolymers and Copolymer

Sulfonic acid groups can be introduced into the homo- or copolymers of vinyl aromatic monomers such as styrene by the direct sulfonation reaction with a sulfonating agent such as an acylsulfate.

The polystyrene thermoplastics suitable for use in the practice of the invention have a glass transition temperature from about 90° C. to about 150° C., more preferably about 90° C. to about 140° C. and most preferably about 90° C. to about 120° C. These polystyrene resins have a weight average molecular weight as measured by GPC of about 5,000 to about 500,000, more preferably about 20,000 to about 350,000 and most preferably about 90,000 to about 300,000. These base polystyrene thermoplastic resins can be prepared directly by any of the known polymerization processes.

The preferred polystyrene thermoplastic resin is a homopolymer of styrene having a number average molecular weight as measured by GPC of about 100,000, and an intrinsic viscosity in toluene of about 0.8. These polymers are widely available commercially in large volume. A suitable material is Dow Polystyrene 666 which affords a suitable molecular weight.

The sulfonated polystyrene resins are formed by dissolving the polystyrene resin in a non-reactive solvent such as chlorinated aliphatic solvent, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the polymer and nonreactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. No. 3,642,728 and 3,836,511, incorporated herein by reference. The sulfonating agents are selected from an acyl sulfate, or a mixture of sulfuric acid and an acid anhydride. The most preferred sulfonation agent for this invention is an acyl sulfate selected from the group consisting of benzoyl, acetyl, propionyl and butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polystyrene backbone. The reaction is quenched with an aliphatic alcohol such as methanol, ethanol or isopropanol, with an aromatic hydroxyl compound, such as phenol, and a cycloaliphatic alcohol such as cyclohexanol or with water. The sulfonated polystyrene resin has about 5 to about 500 meq. sulfonate groups per 100 grams of sulfonated polystyrene, more preferably about 5 to about 300; and most preferably about 5 to about 250. The meq. of sulfonate groups per 100 grams of polymer is determined by both titration of the polymeric sulfonic acid and Dietert Sulfur analysis. In the titration of the sulfonated polymer, the polymer is dissolved in solvent consisting of 95 parts of toluene and 5 parts methanol at a concentration level of 50 grams per liter of solvent. The sulfonated polystyrene resin is titrated with ethanolic sodium hydroxide to an Alizarin-Thymolphthalein end-point.

The sulfonated polystyrene resin is gel-free and hydrolytically stable. Gel is measured by stirring a given weight of polymer in a solvent comprised of 95 toluene-5-methanol at a concentration of 5 wt. %, for 24 hours, allowing the mixture to settle, withdrawing a weighed sample of the supernatant solution and evaporating to dryness. Hydrolytically stable means that the acid function, in this case the unneutralized sulfonate groups, will not be eliminated under neutral or slightly basic conditions to a neutral moiety which is incapable of being converted to highly ionic functionality.

C. Direct Sulfonation of Modified Polymers

Where desirable homopolymers cannot be directly reacted to produce sulfonate-containing materials, it is possible to introduce, by copolymerization, functional groups capable of reacting with sulfonating agents. The two most desirable functional groups for this purpose are double bonds and aromatic groups.

1. Copolymers of Aromatic Monomers

Copolymerization of vinyl monomers with styrene or other vinyl aromatics reactive to sulfonating agents produces copolymers capable of being sulfonated. Illustrative examples are chlorostyrene-styrene, styrene-acrylonitrile, styrene-vinyl acetate, etc. In non-vinylic polymer systems an aromatic group can be introduced into the polymer through the use of an aromatic containing monomer, e.g., phenyl glycidyl ether copolymerized with alkylene oxides. The reagents suitable for the introduction of sulfonic acid groups directly are the same as those useful in the direct sulfonation of homopolymers such as acylsulfate.

2. Polymers Containing Unsaturation

Although unsaturation may be introduced into homopolymers in a number of ways, copolymerization with a conjugated diolefin generally can be relied on to produce thermoplastic materials containing small amounts of unsaturation. Suitable comonomers for the introduction of unsaturation in vinyl polymers are conjugated diolefins, such as butadiene isoprene, dimethylbutadiene, pierylene and non-conjugated diolefins, such as allyl styrene. Copolymers can be made by using any of the applicable initiating systems, i.e., free radical, cationic, anionic, or coordinated anionic. In polyethers, unsaturation can be introduced by copolymerization with unsaturated epoxides such as allyl glycidal ether.

The reagents which are suitable for the direct introduction of sulfonic acid groups into unsaturated thermoplastics are complexes of a sulfur trioxide donor with a Lewis base containing oxygen, sulfur, or phosphorous. Typical sulfur trioxide donors are $SO_3$, chlorosulfonic acid, fluorosulfonic acid, sulfuric acid and oleum. Typical Lewis bases are dioxane, tetrahydrofuran, tetrahydrothiophene, trialkyl phosphates such as triethyl phosphate and carboxylic acids. Expecially suitable of the trialkyl phosphate complexes are those which have a 1:1 ratio of $SO_3$/trialkyl phosphate. The complexes with carboxylic acids, i.e., the acyl sulfates, are most preferred. These sulfonating agents and the process of sulfonating the polymer are described in U.S. Pat. No. 3,642,728, which is herein incorporated by reference.

D. Oxidation of Sulfur Containing Functional Groups

Polymers which contain sulfonic acid groups can be readily air oxidized to sulfonic acids. Polymers containing mercaptan groups can be easily converted to the sulfonic acid groups through oxidation of the mercaptan groups with a variety of oxidizing agents, such as hydrogen peroxide, potassium permanganate and sodium dichromate.

The unneutralized sulfonate-containing polymers of the instant invention are neutralized with polyalkylene oxides possessing amine end groups which are also described as N-polyalkylene oxide substituted amines. The polyalkylene oxide chains are composed of homo- and copolymers of terminal epoxide monomers:

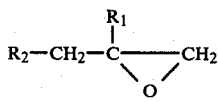

wherein $R_1$ is hydrogen or an alkyl group having about 1 to about 4 carbon atoms, and $R_2$ is hydrogen, an alkyl group, aryl group, halogen, an alkoxy group, or an aryloxy group. Examples are ethylene oxide, propylene oxide, butylene oxide, isobutylene oxide, vinyl cyclohexane epoxide, epichlorohydrin, styrene oxide, methyl glycidyl ether, and phenyl glycidyl ether.

The N-polyalkylene oxide substituted amines can be derived from mono-amines or poly-amines. The mono-amines can be primary, $R_1$-$NH_2$, or secondary, $R_2R_3$-NH, amines wherein the $R_1$, $R_2$ and $R_3$ groups can be alkyl, cycloalkyl, aryl, butyl, decyl, lauryl, octadecyl, cyclohexyl, phenyl, tolyl, benzyl, and the like. The polyamines have the general formula:

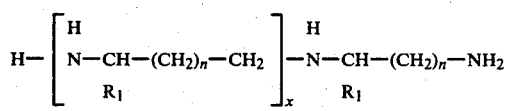

where n=0 to about 4, x=0 to about 5, and $R_1$ is hydrogen, an alkyl or aryl group. Examples of such polyamines are ethylene diamine, 1,2-propylene diamine, 1,3-propylene diamine, 1,6-hexanediamine, diethylene triamine, triethylene, tetramine, and the like. The lower alkylene groups are preferred and the ethylene group is preferred. Of the ethylene derivatives, ethylene diamine itself is most preferred.

The amine terminated polyalkylene oxide chains can be homo- or copolymers of alkylene oxides. The copolymers may be random or block, and the nature of the copolymer and its composition determines, to a large extent, the properties of the neutralized polymer and the applications where such compositions might be useful.

The molecular weights, as measured by GPC, of the amine terminated N-polyalkylene oxides can be from about 600 to about 70,000, preferably about 1000 to about 45,000, most preferably about 1200 to about 30,000.

Useful N-polyalkylene oxide substituted amines are the ethoxylated long-chain, fatty acid-derived amines such as lauryl amine and stearyl amine

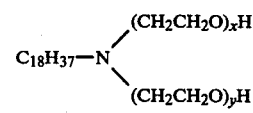

where x and y can be from 5 to 200. Basically useful are ethoxylated stearyl and lauryl amines where x+y=50.

Useful N-polyalkylene oxide substituted polyamines are the Tetronic (BASF Wyandotte) polyols derived from ethylene diamine, ethylene oxide, and propylene oxide.

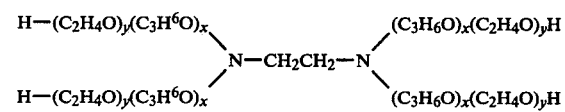

These materials are composed of blocks of propylene oxide and ethylene oxide. They vary in ethylene oxide content (10 to 80 weight %) and in overall molecular weight (1650 to 27,000).

The graft copolymers of this invention possess melt viscosities considerably lower than might be expected simply by an increase in the molecular weight of the base sulfonated thermoplastic polymer. The relatively low molecular weight amines, most especially secondary and tertiary amines, reduce the melt viscosity of sulfonic acid-containing polymers. The high molecular weight branches change the free volume of the graft copolymer system, and this results in a substantial reduction in both melt viscosity and in solution viscosity. These low viscosities then permit the use of higher solution concentrations or the easy processing of the graft copolymers.

The products resulting from the neutralization of sulfonate-containing thermoplastics with amine terminated polyalkylene oxides are determined not only by the composition of the thermoplastic backbone, but also by (1) the sulfonate content of the polymer; (2) the molecular weight of the amine terminated polyalkylene oxide; and (3) the composition of the final neutralized product, i.e., the relative amounts of thermoplastic polymer and amine terminated polyalkylene oxide. It should be clear that the final composition is a function of both sulfonate content and molecular weight of the amine terminated polyalkylene oxide.

The solubility characteristics of the graft copolymers are a function of (1) the solubility characteristics of the main chain and the amine terminated polyalkylene oxide; and (2) the relative amounts of these two copolymer segments in the graft copolymer. One aspect of this invention is graft copolymers wherein the grafts are composed of some or all ethylene oxide units. The solubility of such systems in polar organic solvents, such as alcohols, and even in some cases water, is good.

The sulfonate-containing thermoplastics useful for this invention contain from about 5 meq. to about 500 meq. sulfonate groups per 100 grams of polymer, preferably from about 5 meq. to about 300 meq., and most preferably from about 5 meq. to about 250 meq.

The pressure sensitive adhesive composition comprises a solution of the amine terminated polyalkylene oxide neutralized thermoplastic polymer dissolved in a nonreactive solvent system at about 5 grams to about 25 grams per 100 ml. of the nonreactive solvent system, more preferably about 5 to 20 grams per 100 ml. of the nonreactive solvent system. The nonreactive solvent system is selected from the group consisting of aliphatic and cycloaliphatic hydrocarbon solvents having about 1 to about 12 carbon atoms, aromatic hydrocarbon solvents, halogenated aliphatic and halogenated cycloaliphatic hydrocarbon solvents, and halogenated aromatic hydrocarbon solvents and mixtures thereof. Especially suitable, but not limiting, examples of suitable solvents are toluene, acetone, THF, 1,2-dichloroethane and dimethylformamide.

Commercial Tackifier Resins

To the solution of the amine terminated polyalkylene oxide neutralized sulfonated thermoplastic polymer can optionally be added a commercial tackifying resin having a softening point of about 0° C. to about 160° C., more preferably about 50° C. to about 140° C. and most preferably about 70° C. to 120° C. A variety of commercial tackifier resins are available. Some of these resins contain $\alpha$ and/or $\beta$ pipene base polyterpene resins as the main ingredient while others are derived from the polymerization of petroleum or coal distillates which consist of aliphatic dienes, mono- and diolefins and cyclic olefins having about 5 to about 6 carbon atoms. The latter type of tackifiers have primarily piperlene and/or isoprene structure. A general but excellent description of tackifying resins derived from petroleum derivatives can be found in, for example, *Encyclopedia of Polymer Science and Technology*, Vol. 9, Pages 853 to 860, chapter by John Findlay, published by John Wiley & Sons, N.Y. (1968).

Typical but non-limiting tradenames of these commercial tackifiers are Wingtak of Goodyear, Escorez of Exxon, Piccolyte of Hercules and Zonrez of Arizona Chemicals. Recently these and various other companies have also started marketing relatively higher softening point resins as well. These are generally modified aliphatic hydrocarbon resins and/or hydrogenated polycyclics. The physical appearance of these commercial tackifying resins varies, depending upon their softening point, they can be either viscous liquids or light-colored solids at room temperature. Most often their initial color (Gardner) is about 3.0 to about 7.0 and the density from about 0.7 to 1.0 gm/cm$^3$ at room temperature. The acid number of these resins is usually less than 1. In general, the molecular weight of these commercial tackifying resins is not homogenous, it spreads the number average molecular weight $\overline{M}n$ as measured by GPC can be from about 300 to about 5000 and more preferably about 500 to about 2000 and most preferably about 700 to 1600.

As well known to those familar with the use of tackifying resins, because of their wide range compatability, any of them can be used with sulfonated polymers in proper formulation, which will yield adhesive systems of varying physical characteristics. To cite an example in the present invention, the tackifying resins used are those based on hydrocarbon resins.

These hydrocarbon tackifier resins are incorporated into the pressure sensitive adhesive composition at about 25 to about 700 parts by weight per 100 parts by weight of the amine terminated polyalkylene neutralized oxide sulfonated thermoplastic polymer, more preferably about 50 to about 500, and most preferably about 75 to about 300. As mentioned earlier, to achieve the solvent-based pressure sensitive adhesive, the amine terminated polyethylene oxide neutralized sulfonated polystyrene polymers are dissolved in suitable organic solvents at the desired concentrations. In these solutions, (if desired) to improve or control various adhesive properties of the final pressure-sensitive adhesive, one of the above-mentioned tackifying resins or similar resins can be incorporated in the solution.

Extended Blend Adhesive Composition

To the blend compositions of the hot melt adhesive compositions can be added fillers which are selected from the group consisting of talcs, ground calcium carbonate, water precipitated calcium carbonate, delaminated, calcined or hydrated clays, silicas, and carbon blacks, and mixtures thereof. These fillers can optionally be incorporated into the blend composition at about 5 to about 800 parts by weight per 100 parts by weight of the amine terminated polyalkylene oxide neutralized sulfonated thermoplastic polymer, more preferably at about 50 to about 500; and most preferably at about 75 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85 and most preferably about 10 to about 75. Typical fillers employed in this invention are illustrated in Table I.

TABLE I

| Filler | Code # | Oil Absorption grams of oil/100 grams of filler | Specific Gravity | Average Particle Size Micron | pH |
|---|---|---|---|---|---|
| Calcium Carbonate Ground | Atomite | 15 | 2.71 | | 9.3 |
| Calcium Carbonate Precipitated | Purecal U | 35 | 2.65 | .03–.04 | 9.3 |
| Delaminated Clay | Polyfil DL | 30 | 2.61 | 4.5 | 6.5–7.5 |
| Hydrated Clay | Suprex | | 2.6 | 2 | 4.0 |
| Calcined Clay | Icecap K | 50–55 | 2.63 | 1 | 5.0–6.0 |

TABLE I-continued

| Filler | Code # | Oil Absorption grams of oil/100 grams of filler | Specific Gravity | Average Particle Size Micron | pH |
|---|---|---|---|---|---|
| Magnesium Silicate | Mistron Vapor | 60–70 | 2.75 | 2 | 9.0–7.5 |

Oil-Extended Adhesive Compositions

It is observed that the blend composition of the instant invention can also include oils to further improve low temperature properties and tack characteristics of the resulting adhesives levels of oil of less than about 100 parts by weight per 100 per weight of the amine terminated polyalkylene oxide neutralized sulfonated thermoplastic polymer can be incorporated, more preferably about 1 to about 90 parts. Oils are particularly useful when high levels of petroleum resin tackifiers are used since such materials can harden the resulting composition. Oils can further soften and reduce the cost. Typical oils that can be used may be low viscosity aromatic, naphthenic or paraffin petroleum oils. Typical oils are illustrated in Table II.

TABLE II

| Type Oil | Oil Code # | Viscosity ssu | $M_n$ | % Polars | % Aromatic | % Saturates |
|---|---|---|---|---|---|---|
| Paraffinic | Sunpar 115 | 115 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

DETAILED DESCRIPTION OF THE INVENTION

The advantages of both the physical properties and adhesive characteristics of the blend compositions of the present invention can be more readily appreciated by references to the following Examples and Tables. Unless otherwise defined, the measurements of the compositions are in parts per hundred by weight.

Preparation of the Polymer and Adhesive Compositions and Their Bulk Physical Characteristics

EXAMPLE 1

Styron 666 was sulfonated with acetyl sulfate in 1,2-dichloroethane at 50° C. to obtain a polystyrene sulfonic acid containing 51.3 meq. of sulfonic acid per 100 grams of polymer and possessing a melt index (190° C., 250 psi) of 5.4 grams per 10 minutes. The reaction procedure followed was that according to the procedures described in detail in U.S. Pat. No. 3,856,511, herein incorporated by reference.

Five separate solutions of the sulfonic acid were prepared in methylene chloride, and the sulfonic acid was neutralized with equimolar portions of five separate Tetronic polyols which all contained 40 weight % ethylene oxide, but which varied in molecular weight.

Tetronic polyols have the following general formula

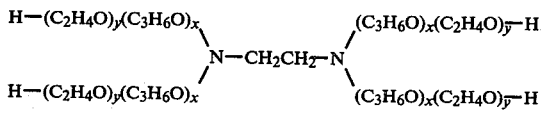

and vary with regard to molecular weight and relative contents of ethylene oxide and propylene oxide. The amount of polystyrene sulfonic acid used was calculated to be that which would provide a total of 100 grams of neutralized product. After adding 0.5 grams of Antioxidant and stirring for 30 minutes, the neutralized products were isolated. These runs are summarized in Table III.

Properties And Discussions

The products contained from 46% to 84% Tetronic polyol. As a result, products were obtained which varied from soft-but-not-sticky solids to thick and very sticky materials which flowed at room temperature. All products were clear and transparent. Sample 5-A was readily molded into a clear and flexible tensile testing pad and possessed a tensile strength of 750 psi and an elongation of 440%.

These results clearly demonstrate the interaction of the basic Tetronic polyol with polystyrene sulfonic acid to produce graft copolymers with a wide variety of properties. This example further illustrates that different type products can be obtained with the same starting sulfonic acid by changing the molecular weight of the amine terminated polyalkylene oxide.

TABLE III

| EXAMPLE | 5-A | 5-B | 5-C | 5-D | 5-E |
|---|---|---|---|---|---|
| Free Acid, Sulfopolystyrene | | | | | |
| SO$_3$H Content, meq./100g Polymer | 51.3 | 51.3 | 51.3 | 51.3 | 51.3 |
| Weight, grams | 54.2 | 36.4 | 26.2 | 19.0 | 15.7 |
| Milliequivalents | 27.8 | 18.7 | 13.4 | 9.8 | 8.0 |
| Tetronic | 304 | 504 | 704 | 1104 | 1304 |
| Molecular Weight | 1650 | 3400 | 5500 | 8300 | 10,500 |
| Weight % Ethylene Oxide | 40 | 40 | 40 | 40 | 40 |
| Weight, grams | 5.8 | 63.6 | 73.8 | 81.0 | 84.3 |
| g/100g Sulfopolystyrene | 84.6 | 174.4 | 282.2 | 425.8 | 538.7 |
| Weight % of Total | 46 | 64 | 74 | 81 | 84 |
| Total Mmoles | 27.8 | 18.7 | 13.4 | 9.8 | 8.0 |
| Mmoles/100g Sulfopolystyrene | 51.3 | 51.3 | 51.3 | 51.3 | 51.3 |
| Appearance* | Soft Solid Not Sticky | Soft, Flows, | Soft, Flows | Solid, Very | Solid, Very |

TABLE III-continued

| EXAMPLE | 5-A | 5-B | 5-C | 5-D | 5-E |
|---|---|---|---|---|---|
|  |  | Sticky | Sticky | Sticky | Sticky |
| Tensile Strength, psi** | 750 | — | — | — | — |
| Elongation, % | 440 | — | — | — | — |

*Physical appearance of the final dried bulk neutralized polymer.
**Properties of the bulk polymer at room temperature.

EXAMPLE 2

The preparations of Example 1 were repeated exactly with the exception that unmodified polystyrene (Styron 666) was used instead of a polystyrene sulfonic acid. In each case, the resultant mixtures were non-homogeneous, separating into a solid phase which was opaque and brittle and an oil. This example demonstrates that Tetronics and polystyrene are essentially incompatible. The homogeneous products obtained in Example 1 are the direct result of the neutralization reaction between the Tetronic and the sulfonic acid groups on the polystyrene backbone. The result is that graft copolymers are formed through this process of neutralization.

EXAMPLE 3

Four separate polystyrene sulfonic acids were prepared as described in the earlier examples. They contained the following sulfonic acid levels and possessed the following melt indexes.

TABLE IV

| Sulfonic Acid, meq./100g Polymer | Melt Index (190° C., 250 psi), g/10 minutes |
|---|---|
| 15.9 | 11.9 |
| 31.6 | 10.2 |
| 51.3 | 5.5 |
| 63.1 | 3.7 |

These four polystyrene sulfonic acids were dissolved in methylene chloride and neutralized with Tetronic 504 (which contains 40 weight % ethylene oxide and possesses a molecular weight of 3400) as described in Example 1. Sufficient polystyrene sulfonic acid was used to result in 100 grams of neutralized product. The product was stabilized and isolated as described in Example 1. Results are given in Table V.

Properties and Discussions

The compositions of the products varied from 35% Tetronic 504 to 68% Tetronic 504 because of the changing sulfonic acid contents of the starting polystyrene sulfonic acids. All products were transparent and homogeneous. They varied in properties from a non-sticky solid (tensile strength 1280 psi, elongation 300%) to soft, sticky fluids which flowed on standing at room temperature. All products possessed very high melt flow especially compared to the starting polystyrene sulfonic acids.

The samples, which at room temperatures are soft and sticky, readily make excellent basis for various pressure sensitive adhesives applications. These materials can readily be dissolved in suitable organic solvents. The solutions can either be sprayed or coated on the substrate and the solvent is evaporated. In case of non-sticky materials, however, tackyfying agents can be incorporated in the solution and be used.

This Example demonstrates the use of an amine terminated polyalkylene oxide containing 40 weight % ethylene oxide and further demonstrates that the product composition and properties can be varied solely through variations in the sulfonic acid level of the polystyrene sulfonic acid.

TABLE V

| EXAMPLE | 7-A | 7-B | 5-B | 7-C |
|---|---|---|---|---|
| Free Acid, Sulfopolystyrene |  |  |  |  |
| SO3H Content, meq./100g Polymer | 15.9 | 31.6 | 51.3 | 63.1 |
| Weight, grams | 64.9 | 48.2 | 36.4 | 31.8 |
| Milliequivalents | 10.3 | 15.2 | 18.7 | 20.1 |
| Tetronic | 504 | 504 | 504 | 504 |
| Molecular Weight | 3400 | 3400 | 3400 | 3400 |
| Weight % Ethylene Oxide | 40 | 40 | 40 | 40 |
| Weight, grams | 35.1 | 51.8 | 63.6 | 68.2 |
| g/100g Sulfopolystyrene | 54.1 | 107.4 | 174.4 | 214.5 |
| Weight % of Total | 35 | 52 | 64 | 68 |
| Total Mmoles | 10.3 | 15.2 | 18.7 | 20.1 |
| Mmoles/100g Sulfopolystyrene | 15.9 | 31.6 | 51.3 | 63.1 |
| Appearance* | Solid, Not Sticky | Soft Solid, Very Sticky | Soft, Flows at Room Temp. | Soft, Flows at Room Temp. |
| Tensile Strength, psi** | 1280 | — | — | — |
| Elongation, % | 300 | — | — | — |

*Physical appearance of the final dried bulk neutralized polymer.
**Properties of the bulk polymer at room temperature.

EXAMPLE 4

The graft copolymer preparations described in Example 3 were repeated with the exception that a different Tetronic (1104) was used. Tetronic 1104 has a higher molecular weight of 8300, but the same 40 weight % ethylene oxide content as Tetronic 504. Results are give in Table VI.

The products derived from these neutralizations contained from 57 weight % to 84 weight % Tetronic. These results obtained from the use of polystyrene sulfonic acids varying in sulfonic acid content.

This Example demonstrates the preparation of products with very high levels of grafting oligomer and further demonstrates that variations in compositions, and therefore product properties, can be obtained either through variation in the sulfonic acid level of the base polymer or the molecular weight of the grafting oligomer or both.

varied in composition from 66 weight % to 81 weight % Tetronic.

TABLE VI

| EXAMPLE | 8-A | 8-B | 5-D | 8-C |
|---|---|---|---|---|
| Free Acid, Sulfopolystyrene | | | | |
| SO$_3$H Content, meq./100g Polymer | 15.9 | 31.6 | 51.3 | 63.1 |
| Weight, grams | 43.1 | 27.6 | 19.0 | 16.0 |
| Milliequivalents | 6.9 | 8.7 | 9.8 | 10.1 |
| Tetronic | 1104 | 1104 | 1104 | 1104 |
| Molecular Weight | 8300 | 8300 | 8300 | 8300 |
| Weight % Ethylene Oxide | 40 | 40 | 440 | 40 |
| Weight, grams | 56.9 | 72.4 | 81.0 | 84.0 |
| g/100g Sulfopolystyrene | 132.0 | 262.3 | 425.8 | 523.7 |
| Weight % of Total | 57 | 72 | 81 | 84 |
| Total Mmoles | 6.9 | 8.7 | 9.8 | 10.1 |
| Mmoles/100g Sulfopolystyrene | 15.9 | 31.6 | 51.3 | 63.1 |
| Appearance* | Solid, A Little Sticky | Very Soft, Very Sticky | Solid, Very Sticky | Very Soft, Very Sticky |
| Tensile Strength, psi** | 230 | 170 | — | — |
| Elongation, % | 720 | 720 | — | — |

*Physical appearance of the final dried bulk neutralized polymer.
**Properties of the bulk polymer at room temperature.

EXAMPLE 5

The graft copolymer preparations described in Example 4 were repeated with the exception that Tetronic 1107 was used for neutralization rather than Tetronic 504. Tetronic 1107 has both a higher molecular weight (14,500) and a higher ethylene oxide content (70 weight) than Tetronic 504. Results are tabulated in Table VII.

All the products were dry, hard and brittle which reflected both the high ethylene oxide content of the Tetronic and the very high proportion (from 70 weight % to 90 weight %) of Tetronic in the products. All possessed extremely high flow rates (not measurable).

This Example demonstrates the use of higher molecular weight amine terminated polyalkylene oxides and the use of higher ethylene oxide copolymers.

EXAMPLE 6

Graft copolymers through the neutralization of polystyrene sulfonic acid with Tetronics were prepared from a polystyrene sulfonic acid containing 15.9 meq. sulfonic acid per 100 grams polymer. High ethylene oxide content Tetronics (70–80 weight %) were used varying in molecular weight from 12,000 to 27,000. Preparations were conducted as described in earlier Examples. Results are given in Table VIII.

The products were dry, hard, and brittle in all cases. Melt flow rates were too high to measure. The products This Example illustrates the use of very high molecular weight amine terminated polyalkylene oxides in combination with a relatively low sulfonic acid level polystyrene sulfonic acid.

TABLE VII

| EXAMPLE | 9-A | 9-B | 9-C | 9-D |
|---|---|---|---|---|
| Free Acid, Sulfopolystyrene | | | | |
| SO$_3$H Content, meq./100g Polymer | 15.9 | 31.6 | 51.3 | 63.1 |
| Weight, grams | 30.2 | 17.9 | 11.8 | 9.9 |
| Milliequivalents | 4.8 | 5.7 | 6.1 | 6.2 |
| Tetronic | 1107 | 1107 | 1107 | 1107 |
| Molecular Weight | 14,500 | 14,500 | 14,500 | 14,500 |
| Weight % Ethylene Oxide | 70 | 70 | 70 | 70 |
| Weight, grams | 69.8 | 82.1 | 88.2 | 90.1 |
| g/100g Sulfopolystyrene | 230.6 | 458.2 | 743.9 | 915.0 |
| Weight % of Total | 70 | 82 | 88 | 90 |
| Total Mmoles | 4.8 | 5.7 | 6.1 | 6.2 |
| Mmoles/100g Sulfopolystyrene | 15.9 | 31.6 | 51.3 | 63.1 |
| Appearance* | Dry, Hard Brittle | Dry, Hard Brittle | Dry, Hard Brittle | Dry, Hard Brittle |

*Physical appearance of the final dried bulk neutralized polymer.

EXAMPLE 7

Adhesive compositions—most of the samples of Examples 2 through 6 (Tables III–VIII) could be used for pressure-sensitive applications. The requirements for them to make as basis for solvent-based pressure-sensitive adhesive is that these polymers should be ready soluble in suitable solvents and should have high enough tackiness so that they can stick to the surfaces after applications. The first; the solubility criterion for almost all of the samples listed through Tables III–VIII is met. It can also be seen from bottom portions of these Tables that most of these polymers have inherently tackiness or stickiness in them. The samples which were inherently poor or devoid in the desired degree of tackiness could be used in conjunction with commonly available commercial tackifying results. The desired degree of tackiness can easily be achieved through the proper control of compositions of these polymers into resins, plasticizers etc. by a user or a formulator who is well familiar with the art. For the present invention, for illustrative purposes only, few compositions involving these polymers and commercially available tackifying resins were made and are illustrated in Table IX. The samples 5-B of Table III and 7-C of Table V were dissolved in toluene at a concentration level of about 10 g/100 ml. of the solvent.

After the polymer was completely dissolved, the desired amount of resins (in this case Escorez Resin 1310 produced by Exxon Chemical Company, at concentration level of about 25 percent of the polymer) was added. The composition details and the qualitative properties of the final adhesives are shown in Table IX. The solutions were made in a beaker which were continuously stirred with a magnetic stirrer. After some time, when all the resins were completely mixed with the polymer, the solutions were left in a hood to flash-off the bulk of solvent. In each case, after a few hours of drying, the thick concentrated viscous solution was poured over a substrate which in our case was a mylar film. The film coated with the adhesive layer was dried in a vacuum oven.

TABLE VIII

| EXAMPLE | 10-A | 9-A | 10-B | 10-C |
|---|---|---|---|---|
| Free Acid, Sulfopolystyrene | | | | |
| SO$_3$H Content, meq./100g Polymer | 15.9 | 15.9 | 15.9 | 15.9 |
| Weight, grams | 34.4 | 30.2 | 25.3 | 18.9 |
| Milliequivalents | 5.5 | 4.8 | 4.0 | 3.0 |
| Tetronic | 707 | 1107 | 1307 | 1508 |
| Molecular Weight | 12,000 | 14,500 | 18,600 | 27,000 |
| Weight % Ethylene Oxide | 70 | 70 | 70 | 80 |
| Weight, grams | 65.6 | 69.8 | 74.7 | 81.1 |
| g/100g Sulfopolystyrene | 190.8 | 230.6 | 295.6 | 429.3 |
| Weight % of Total | 66 | 70 | 75 | 81 |
| Total Mmoles | 5.5 | 4.8 | 4.0 | 4.0 |
| Mmoles/100g Sulfopolystyrene | 15.9 | 15.9 | 15.9 | 15.9 |
| Appearance* | Dry, Hard Brittle | Dry, Hard Brittle | Dry, Hard Brittle | Dry, Hard Brittle |

*Physical appearance of the final dried bulk neutralized polymer.

The exact thickness and uniformity of the adhesive film was not controlled. Visually, however, it looked fairly uniform. In industry, a doctor's knife is often used to control the thickness and uniformity of the adhesive layer on a substrate. This was not required due to the illustrative nature of the present invention. Subjective figures tests for the tackiness were made and the results are reported in the ninth column of Table IX. The quantitative peel strength values of the adhesive films are also reported in the eighth column of this Table. The T-Peel tests were done following ASTM test methods on the films which were compression pressed.

TABLE IX

The Solution Based Pressure-Sensitive Adhesive Compositions And Their Properties Incorporating Amine Terminated Polyethylene Oxide Neutralized Sulfonated Polystyrenes

| | Polymer Composition | | | Adhesive Composition | | Peel Strength | | |
|---|---|---|---|---|---|---|---|---|
| Sample | % Ethylene Oxide | Mol. wt. | % of Total | Parts Polymer | Parts Resin | Solvent | lbs. | Tackiness |
| 5-B (Table III) | 40 | 3400 | 64 | 75 | 25 | Toluene | 0.52 | Tacky |
| 7-C (Table V) | 40 | 3400 | 68 | 75 | 25 | Toluene | 0.27 | Tacky |

What is claimed is:

1. A pressure-sensitive adhesive composition comprising an amine terminated polyalkylene oxide neutralized sulfonated polymer dissolved in a nonreactive solvent system at a concentration level of about 5 to about 25 grams per 100 ml. of the nonreactive solvent system, wherein the amine terminated polyalkylene oxide of said amine terminated polyalkylene oxide neutralized sulfonated thermoplastic resin is an ethoxylated long-chain fatty acid derived amine having the formula:

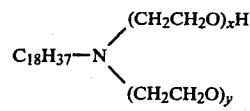

wherein $x+y=5$ to 200.

2. The composition according to claim 1 wherein said thermoplastic is selected from the group consisting of polymers prepared by a direct addition polymerization process, wherein the chief monomeric component is selected from the group consisting of the following:

Alpha olefins, such as styrene, vinyl toluene, t-butylstyrene, alpha-methyl styrene, chlorostyrene, vinyl cyclohexane, 1,6-hexadiene, and the like; acrylates and methacrylates, such as methyl methacrylate; vinyl acylates, such as vinyl acetate; vinyl halides, such as vinyl chloride; nitrile containing monomers, such as acrylonitrile and methacrylonitrile; cyclic monomers, such as oxycyclobutane, tetrahydrofuran, trimethylene sulfide, lactones, e.g., caprolactone; aldehydes, such as formaldehyde, acetaldehyde; vinyl alkyl ethers; and amide containing monomers, such as acrylamide.

3. The composition according to claim 1 wherein said thermoplastic is a polyaromatic selected from the group consisting of polystyrene, poly-t-butylstyrene, polyvinyl toluene, and polyalpha-methyl styrene.

4. A composition according to claim 2 wherein said polyalkylene oxide substituted amines which are ethoxylated long-chain fatty acid derived amines have the formula:

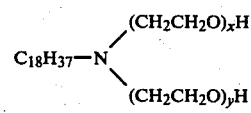

wherein $x+y$ equals 5 to 200.

5. A composition according to claim 1 wherein said composition is extended with a filler or oil or mixture thereof.

* * * * *